United States Patent
Fuchs

(10) Patent No.: US 10,253,209 B2
(45) Date of Patent: Apr. 9, 2019

(54) PAINT REPLACEMENT FILM WITH POLYMER LAYER CONTAINING POLYURETHANE

(71) Applicant: 3M INNOVATIVE PROPERTIES COMPANY, St. Paul, MN (US)

(72) Inventor: Iris L. Fuchs, Willich (DE)

( * ) Notice: Subject to any disclaimer, the term of this patent is extended or adjusted under 35 U.S.C. 154(b) by 521 days.

(21) Appl. No.: 14/897,119

(22) PCT Filed: Jun. 24, 2014

(86) PCT No.: PCT/US2014/043755
§ 371 (c)(1),
(2) Date: Dec. 9, 2015

(87) PCT Pub. No.: WO2014/209928
PCT Pub. Date: Dec. 31, 2014

(65) Prior Publication Data
US 2016/0130467 A1    May 12, 2016

(30) Foreign Application Priority Data
Jun. 24, 2013  (EP) .................... 13173460

(51) Int. Cl.
| | | |
|---|---|---|
| C09D 175/06 | (2006.01) | |
| C09J 7/10 | (2018.01) | |
| B32B 27/40 | (2006.01) | |
| C08J 5/18 | (2006.01) | |
| C08G 18/80 | (2006.01) | |
| C08G 18/40 | (2006.01) | |
| C08G 18/42 | (2006.01) | |
| C08G 18/44 | (2006.01) | |
| C09J 5/00 | (2006.01) | |
| C09J 7/38 | (2018.01) | |
| C09J 7/25 | (2018.01) | |
| C09J 7/29 | (2018.01) | |
| C09J 7/21 | (2018.01) | |
| C09J 133/00 | (2006.01) | |

(52) U.S. Cl.
CPC ............ *C09D 175/06* (2013.01); *B32B 27/40* (2013.01); *C08G 18/4063* (2013.01); *C08G 18/4202* (2013.01); *C08G 18/44* (2013.01); *C08G 18/807* (2013.01); *C08G 18/8093* (2013.01); *C08J 5/18* (2013.01); *C09J 5/00* (2013.01); *C09J 7/10* (2018.01); *C09J 7/21* (2018.01); *C09J 7/25* (2018.01); *C09J 7/29* (2018.01); *C09J 7/38* (2018.01); *B32B 2307/712* (2013.01); *B32B 2307/714* (2013.01); *B32B 2405/00* (2013.01); *B32B 2556/00* (2013.01); *B32B 2605/00* (2013.01); *C09J 133/00* (2013.01); *C09J 2201/606* (2013.01); *C09J 2433/00* (2013.01); *C09J 2475/006* (2013.01)

(58) Field of Classification Search
CPC . C09D 175/04; C09J 7/045; C09J 7/10; C09J 7/21; C09J 7/25; C09J 7/29; C09J 7/38; C09J 5/00; C09J 133/00; C09J 2201/606; C09J 2433/00; C09J 2475/006; C08G 18/807; C08G 18/8093; C08G 18/4063; C08G 18/4202; C08G 18/44; C08J 5/18
See application file for complete search history.

(56) References Cited

U.S. PATENT DOCUMENTS

| | | |
|---|---|---|
| 4,485,226 A | 11/1984 | Noll et al. |
| 4,495,229 A | 1/1985 | Wolf et al. |
| 4,550,052 A | 10/1985 | Malek |
| 4,624,996 A | 11/1986 | Rizk et al. |
| 4,767,836 A | 8/1988 | Cuscurida et al. |
| 4,808,471 A * | 2/1989 | Grunzinger ........ C08G 18/6229 428/325 |
| 5,202,406 A | 4/1993 | Dearth et al. |
| 5,532,313 A | 7/1996 | Konig et al. |
| 5,688,573 A | 11/1997 | Goeb et al. |
| 6,110,580 A | 8/2000 | Gebreselassie et al. |
| 6,808,587 B2 | 10/2004 | Bohm et al. |
| 6,998,439 B2 | 2/2006 | Shikano |
| 7,638,197 B2 | 12/2009 | Haas et al. |
| 8,501,315 B2 | 8/2013 | Tanaka et al. |
| 2002/0001723 A1 * | 1/2002 | Fuchs ..................... B32B 27/40 428/424.4 |
| 2002/0114939 A1 | 8/2002 | Schumann et al. |
| 2005/0170189 A1 | 8/2005 | Haas et al. |
| 2006/0127666 A1 * | 6/2006 | Fuchs ......................... C09J 7/29 428/343 |
| 2007/0231569 A1 | 10/2007 | Tanaka et al. |
| 2008/0166485 A1 * | 7/2008 | Steenwinkel ....... C08F 283/006 427/385.5 |
| 2008/0176078 A1 | 7/2008 | Tanaka |

(Continued)

FOREIGN PATENT DOCUMENTS

| | | |
|---|---|---|
| EP | 0359532 | 3/1990 |
| EP | 1095956 | 5/2001 |

(Continued)

OTHER PUBLICATIONS

International Search report for PCT International Application No. PCT/US2014/043755 dated Sep. 11, 2014, 3 pages.

*Primary Examiner* — Erma C Cameron
(74) *Attorney, Agent, or Firm* — Philip P. Soo; Harold C. Knecht, III

(57) ABSTRACT

A paint replacement film comprising a polymer layer comprising a polyurethane produced from a formulation comprising at least one blocked isocyanate. The paint replacement film comprises a liner layer and the formulation comprises at least two polyols in OH weight equivalent ratio in the range 4.5:1 to 1:4.5. The formulation may comprise a colorant and the polyurethane may have a glass transition temperature ($T_g$) below 42° C. Also disclosed is a method of producing a paint replacement film, by providing a backing layer, providing the liquid formulation, cast-coating the backing layer with the liquid formulation, and gelling the liquid formulation, thereby forming a polymer layer comprising polyurethane. The paint replacement films are useful for replacing paint on surfaces especially in automotive applications.

2 Claims, No Drawings

(56) References Cited

U.S. PATENT DOCUMENTS

| | | |
|---|---|---|
| 2010/0009108 A1 | 1/2010 | Shih |
| 2010/0059167 A1 | 3/2010 | McGuire, Jr. |
| 2010/0086720 A1 | 4/2010 | Ho et al. |
| 2014/0349062 A1 | 11/2014 | Chandrasekaran et al. |

FOREIGN PATENT DOCUMENTS

| | | |
|---|---|---|
| EP | 0861742 | 7/2001 |
| EP | 2363427 | 9/2011 |
| JP | 2000-0119318 | 4/2000 |
| JP | 2005028769 | 2/2005 |
| JP | 2005145044 | 6/2005 |
| JP | 2005206724 | 8/2005 |
| JP | 2009083263 | 4/2009 |
| WO | WO 94/11433 | 5/1994 |
| WO | WO 99/61216 | 12/1999 |
| WO | WO 00/33975 | 6/2000 |
| WO | WO 00/78539 | 12/2000 |
| WO | WO 01/96489 | 12/2001 |
| WO | WO 03/011972 | 2/2003 |
| WO | WO 2005/068187 | 7/2005 |
| WO | WO 2007/039077 | 4/2007 |
| WO | WO 2007/059282 | 5/2007 |
| WO | WO 2007/099851 | 7/2007 |
| WO | WO 2007/115611 | 10/2007 |
| WO | WO 2008/035825 | 3/2008 |
| WO | WO 2010/135545 | 11/2010 |

\* cited by examiner

PAINT REPLACEMENT FILM WITH POLYMER LAYER CONTAINING POLYURETHANE

CROSS REFERENCE TO RELATED APPLICATIONS

This application is a national stage filing under 35 U.S.C. 371 of PCT/US2014/043755, filed Jun. 24, 2014, which claims priority to European Application No. 13173460.0, filed Jun. 24, 2013, the disclosures of which are incorporated by reference in their entireties herein.

FIELD OF THE INVENTION

The present invention relates to paint replacement films, to methods for producing paint replacement films and to methods for applying paint replacement films to a surface. The present invention also relates to surfaces covered by polymer films.

BACKGROUND

Polyurethane sheet materials are known. For example, U.S. Pat. No. 5,688,573 discloses a halogen-free acrylic urethane sheet material which can be marked by conventional printing methods and by radiation methods.

Paint replacement films find use in many areas. One area of particular interest is paint replacement films for exterior surfaces of vehicles. Paint replacement films on vehicles must have acceptable colour consistency, weatherability, chemical resistance and durability.

Prior art paint replacement films include those based on polyvinyl chloride (PVC). As well as pure PVC films, PVC films with a top-coat are also known the top-coat being used to improve weatherability, chemical resistance and durability. Known top-coats are relatively hard with the consequence that they are not stretchable, which may sometimes lead to top-coat cracks after exterior exposure. There is generally a need, because of environmental concerns, to reduce the amount of PVC. Paint replacement films based on a dual cure polyurethane (PU) system are known.

Other paint replacement films based on fluoropolymer films on backing sheets are known. WO-A-2007/059282 discloses a decorative paint film laminate having high gloss and distinctness of image after processing for providing a decorative finish for a part. The films of WO-A-2007/059282 contain polyvinylidene fluoride (PVDF), or polyvinyl fluoride (PVF) fluoropolymer layers.

Multilayer sheets intended for paint replacement for thermoforming are also known including a product consisting of a carrier layer, a layer of acrylonitrile styrene acrylate (ASA)/polycarbonate (PC), and a top layer of poly(methyl methacrylate) (PMMA).

For many of these known films, film coated surfaces have properties that are close to the requirements of paint coated surfaces. However, some of the films suffer disadvantages that prevent or reduce their general use as paint replacements. The known films can usually only be applied during manufacture of vehicle (or other) components e.g. door or roof.

There is a need to provide paint replacement films, especially for vehicles, with properties of chemical resistance and weatherability that are close to those of paint as well as stretchability.

SUMMARY OF THE INVENTION

In one aspect of the present invention, a paint replacement film is provided that comprises at least one polymer layer, with the at least one polymer layer comprising a polyurethane produced from a formulation comprising at least one blocked isocyanate. The paint replacement film comprises a liner layer and in that the formulation comprises at least two polyols in an OH weight equivalent ratio in the range 4.5:1 to 1:4.5.

In another aspect of the present invention, a method of producing a paint replacement film is provided, with the method comprising: providing a backing layer, providing a liquid formulation comprising at least two polyols in an OH weight equivalent ratio in the range 4.5:1 to 1:4.5 and one or more blocked isocyanates, cast-coating the backing layer with the liquid formulation, and gelling the liquid formulation, thereby forming a polymer layer comprising polyurethane.

In an additional aspect of the present invention, a method of covering a surface is provided, with the method comprising, providing a paint replacement film according to the present invention, removing the liner layer of the paint replacement film, and applying the polymer film to the surface.

In another aspect of the present invention, a motor vehicle is provided having at least one surface at least a portion of said surface being covered with a paint replacement layer adhered to the surface, with the paint replacement layer comprising a polymer layer comprising a polyurethane produced from at least one blocked polyurethane precursor.

DETAILED DESCRIPTION

In a first aspect, the present invention accordingly provides a paint replacement film comprising at least one polymer layer, the at least one polymer layer comprising a polyurethane produced from a formulation comprising at least one blocked isocyanate, characterised in that the paint replacement film comprises a liner layer and in that the formulation comprises at least two polyols in an OH weight equivalent ratio in the range 4.5:1 to 1:4.5 (100% solids basis).

It is preferred if the polyurethane is formed (e.g. by selection of the polyol(s) and/or isocyanate(s)) so as to have a glass transition temperature ($T_g$) below 42° C., preferably below 40° C., more preferably below 38° C. and most preferably below 37° C.

In a second aspect the present invention provides a paint replacement film comprising a polymer layer comprising a polyurethane produced from a formulation comprising at least one blocked isocyanate, characterised in that the paint replacement film further comprises a liner layer and in that the polyurethane has a glass transition temperature ($T_g$) below 42° C. The polyurethane preferably has a glass transition temperature ($T_g$) below 40° C., more preferably below 38° C. and most preferably below 37° C.

Preferably, the polyurethane will have a glass transition temperature ($T_g$) in the range −20° C. to 42° C., preferably −10° C. to 42° C. or to 40° C., more preferably 0° C. to 42° C., to 40° C. or to 38° C. and most preferably 0° C. to 37° C.

Blocked isocyanates are advantageous in the aspects of the invention because they provide a long (preferably an unlimited) pot life for the formulation (before use of the formulation to produce the polyurethane) that provides great advantages in manufacture of the paint replacement film. Furthermore, the use of a blocked isocyanate precursor enables a one pot formulation to be used, simplifying manufacture and addition of the, optional, colourant during manufacture.

The polymer layer may be a coloured polymer layer further comprising a colourant. Generally, the colourants will not significantly modify the properties of the polyurethane polymer layer. Thus, different colourants may be used usually interchangeably. Alternatively, the polymer layer may be substantially transparent or translucent (i.e. having no added colourant).

The paint replacement film may comprise a single polymer layer or two or more polymer layers. If there are two, or more, polymer layers each polymer layer may be a coloured layer or each polymer layer may be a colour-free layer. Alternatively, in e.g. a two layer system one polymer layer may be a coloured polymer layer and one polymer layer (usually the top polymer layer) may be a colour-free (usually a transparent or translucent) polymer layer.

Preferably the paint replacement film will further comprise an adhesive layer. An adhesive layer is advantageous because it allows the production of a self-adhesive paint replacement layer that may be used to replace paint even after manufacture of parts of e.g. a vehicle. Self-adhesive paint replacement layers may be used to provide transparent films or coloured films on surfaces, especially for automotive applications, for example body colour application for vehicles, graphics on the vehicle or different coloured components (e.g. roof). Preferably the adhesive layer will be a pressure sensitive adhesive layer.

Particularly useful adhesives and especially pressure sensitive adhesives include those that are capable of retaining microstructured features on an exposed surface. Thus, preferably the adhesive layer is a microstructured adhesive layer.

In a preferred embodiment, the liner layer is a microstructured liner layer. This is particularly advantageous because it enables a convenient way of defining a microstructured adhesive layer.

"Microstructure" means the configuration of structures wherein at least one dimension of the structures is microscopic (i.e. have a dimension of generally less than 1 mm to less than 0.25 mm).

The microstructured adhesive preferably comprises channels in the adhesive. The channels may comprise a volume of at least $1 \times 10^3$ µm$^3$ per any 500 µm diameter circular area in the adhesive. The channels are advantageous because they create exit pathways for fluid (e.g. air) egress to a periphery of the film when the film is applied to a surface. Additionally, the microstructured adhesive enables the convenient positioning of the film on to a surface.

Thus, preferably, the microstructured adhesive layer comprises microstructured channels.

The channels are preferably continuous open pathways or grooves that extend into the adhesive from the exposed surface. The channels may either terminate at the peripheral portion of the adhesive layer or communicate with other channels that terminate at a peripheral portion of the paint replacement film. The shape of the channels can vary widely according to the processing methods, but each preferably has a V-shaped, U-shaped, rectangular or trapezoidal cross section. The structures may be either placed randomly about the surface of the adhesive or placed in regular patterns.

In general, the microstructured adhesive layer on a paint replacement film enables the paint replacement film to be positionable over a surface prior to forceful application of the film onto the surface. The microstructured surface of the adhesive permits the article to either slide over the surface of a substrate, or be easily removed from the surface of the substrate, until enough pressure is applied to enable a bond between the adhesive and the surface of the substrate. The microstructure of the adhesive layer also enhances the egress of fluid (e.g. air) from the interface between the adhesive and the substrate as a bonding force is applied to the paint replacement film.

The microstructured surface can be formed by directly embossing the pressure sensitive adhesive layer. The microstructured features may be applied by embossing with a microstructured molding tool, backing or liner, or by being coated on a microstructured molding tool, backing or liner from which it is subsequently removed. Alternatively, and preferably, a liner layer may be embossed first and then coated with a pressure sensitive adhesive to impart the structures to the adhesive.

The particular adhesive selected is dependent upon the type of substrate the film will be applied onto and the microstructuring method employed in producing the adhesive-backed article. Additionally, useful microstructured pressure sensitive adhesives are usually capable of retaining their microstructured surfaces for a time sufficient to allow utilization of the adhesive-backed article.

Thus, generally any pressure-sensitive adhesive may be suitable for the invention. Adhesives are typically selected based upon the type of substrate that they are to be adhered to. Classes of pressure-sensitive adhesives include acrylics, tackified rubber, tackified synthetic rubber, ethylene vinyl acetate, silicone, and similar adhesives.

A preferred class of pressure-sensitive adhesives are those that are the reaction product of at least alkyl acrylate with at least one reinforcing co-monomer. Suitable alkyl acrylates are those having a homopolymer glass transition temperature below about −10° C. and include, for example, n-butyl acrylate, 2-ethylhexylacrylate, isoctylacrylate, isononyl acrylate, octadecyl acrylate and the like. Suitable reinforcing monomers are those having a homopolymer glass transition temperature about −10° C. and include for example, acrylic acid, itaconic acid, isobornyl acrylate, N,N-dimethylacrylamide, N-vinyl caprolactam, N-vinyl pyrrolidone, and the like.

The adhesives may be polymers that are dispersed in solvent or water and coated onto the release liner and dried, and optionally crosslinked. If a solvent-borne or waterborne pressure-sensitive adhesive composition is employed, then the adhesive layer preferably undergoes a drying step to remove all or a majority of the carrier liquid. Additional coating steps may be necessary to achieve a smooth surface. The adhesives may also be hot melt coated onto the liner or microstructured backing. Additionally, monomeric pre-adhesive compositions can be coated onto the liner and polymerized with an energy source such as heat, UV radiation, or e-beam radiation.

The thickness of the optional adhesive layer is dependent upon several factors, including for example, the adhesive composition, the type of structures used to form the microstructured surface, the type of substrate, and the thickness of the film. In general, the thickness of the adhesive layer is greater than the height of the structures that comprise the microstructured surface.

The optional, and preferred, adhesive layer where present will usually have a thickness in the range 10 to 100 μm, preferably 20 to 75 μm, more preferably 25 to 50 μm and most preferably 30 to 40 μm.

The pressure sensitive adhesive can optionally include one or more additives. Depending on the method of polymerization, the coating method, the end use, etc., additives selected from the group consisting of initiators, fillers, plasticizers, tackifiers, chain transfer agents, fibrous reinforcing agents, woven and non-woven fabrics, foaming agents, antioxidants, stabilizers, fire retardants, viscosity enhancing agents, colouring agents, and mixtures thereof can be used.

When using an adhesive layer chemical or physical pre-treatment may optionally be used to promote the adhesion between the polymer layer and the adhesive layer. One possible chemical pre-treatment is to use a primer. The type of primer that is suitable will vary depending on the polymer layer and adhesive layer used. Examples of suitable primers include chlorinated polyolefins, polyamides, and modified acrylic polymers. Typically, primers are dispersed into an adequate solvent in very low concentrations, e.g., less that about 5% solids, and coated onto the film, and dried at room or elevated temperatures to form a very thin layer. Typical solvents used may include water, heptane, toluene, acetone, ethyl acetate, isopropanol, and the like, used alone or as blends thereof. Physical pre-treatment methods employed are preferably those of flame, plasma or corona treatment.

In manufacturing the polymer layer it may be cast on a carrier (also known as a backing) layer. Selection of a suitable (carrier) backing layers enables a polymer layer having pre determined gloss and appearance to be produced. Thus, the paint replacement film may have a matt, gloss or textured appearance.

The backing layer (that may alternatively be called a carrier layer) is advantageous because it provides a support on which the polyurethane layer may, optionally, be cast coated. Suitable carrier/backing layers may be based on paper (preferably polymer coated paper) or polymer backing layers for example polyethylene terephthalate (PET) or other suitable materials.

Thus, the paint replacement film may further comprise a backing layer. If an adhesive layer is present, preferably, the polymer (polyurethane layer) layer is adhesive backed on the opposite side to the backing layer, the adhesive layer preferably having a microstructured surface preferably imparted by a microstructured liner.

A surprising advantage of the present invention is that polymer layers according to the invention are stretchable and conformable to enable good coverage (preferably without wrinkling) of surfaces. Thus, preferably the polyurethane has an elongation to break of greater than 80%, more preferably of greater than 90% and most preferably of greater than 100%.

It is preferred if the at least one blocked isocyanate comprises a blocked aliphatic isocyanate. This has proven to be advantageous because use of aliphatic isocyanates, in the films of the present invention, provide polymer layers less susceptible to weathering.

Preferred examples of suitable isocyanates may be selected from at least one of hexamethylene diisocyanate (HDI) or isophorone diisocyanate (IPDI) or 4,4'-dicyclohexylmethanediisocyanate (H12MDI) or a mixture of two or more of these isocyanates.

The blocked isocyanate may be blocked with any generally known blocking agent. Preferred blocking agents may be selected from at least one of an ester, an ether, an amine, a malonate, a pyrazole, an oxime, a phenol, or a lactam. The most preferred blocking agents may be selected from at least one of diethyl malonate (DEM), or diisopropyl amine (DIPA), methylethylketoxime (MEKO), caprolactam (ecap), 3,5 dimethyl pyrazole (DMP), t-butyl benzyl amine (BEBA), glycol ether or a mixture of these blocking agents.

It is preferred if at least one of the polyols is selected from polycaprolactone, a branched polyester, a linear polyester, an aliphatic polycarbonate polyester, or a hydroxyl bearing polyacrylate.

Preferably, the % OH in the polyols is in the range 0.5% to 25%, more preferably 1% to 20% and most preferably 1% to 15%. The most preferred ranges of % OH for different categories of polyol are generally as follows (based on 100% solid resin): polyester polyols 1% to 15%, polycarbonate and/or polycarbonate ester 1% to 8%, polycaprolactone polyols 1% to 10%, polyacrylate polyols 2% to 8%.

If used, preferably the polycaprolactone polyol have a functionality of 2, 3 or 4 and/or a molecular weight (Mw) below 1000.

Preferably, the OH weight equivalent ratio of polyols is in the range 1:4 to 4:1, more preferably 1:3 to 3:1, most preferably 1:2.7 to 2.7:1

Where there is an adhesive layer, preferably the adhesive layer is contiguous, more preferably wholly contiguous with the polymer layer (i.e. extending over the whole of the polymer layer). This is advantageous because it ensures that adhesive is present over the whole extent of the polymer layer that significantly improves adhesion to the surface to be covered.

The paint replacement film may further comprise at least one further layer if necessary. The further layer may be a further layer of polyurethane to provide enhanced or modified properties to the film.

The liner layer may comprise any suitable substrate, for example polyethylene terephthalate (PET) or preferably kraft paper.

The formulation of the polymer layer may further comprise one or more additives to enhance or improve the properties of the polyurethane layer. Such additives may be selected from one or more of ultraviolet absorbers, antioxidants, catalysts, and/or wetting agents.

Usually, the polymer layer will have a thickness in the range 20 to 200 μm, preferably 40 to 150 μm, more preferably 45 to 120 μm and most preferably 50 to 110 μm.

Any suitable colourant may be used depending upon the intended use and required colour. Examples of suitable colourants include (or may be selected from) one or more of titanium oxide, carbon black, red pigment, yellow pigment, green pigment, aluminium pigment.

In a third aspect, the present invention provides a method of producing a paint replacement film, the method comprising, providing a backing layer, providing a liquid formulation comprising at least two polyols in an OH weight equivalent ratio in the range 4.5:1 to 1:4.5 and one or more blocked isocyanates, cast-coating the backing layer with the liquid formulation, and gelling the liquid formulation, thereby forming a polymer layer comprising polyurethane.

Alternatively, the present invention provides a method of producing a paint replacement film, the method comprising, providing a backing layer, providing a liquid formulation comprising at least one polyol and at least one blocked isocyanate, the at least one polyol and isocyanate being selected so as to provide a polyurethane having a glass transition temperature ($T_g$) below 42° C. (preferably below 40° C., more preferably below 38° C. and most preferably below 37° C.), cast-coating the backing layer with the liquid formulation, and gelling the liquid formulation, thereby forming a polymer layer comprising polyurethane having a glass transition temperature ($T_g$) below 42° C. (preferably below 40° C., more preferably below 38° C. and most preferably below 37° C.).

The invention is greatly advantageous because it can use the cast method. The cast method uses a liquid precursor and thus enables excellent and thorough mixing of the components in the polymer formulation. This is particularly important in paint replacement films because it is important to ensure consistent appearance across the film. In particular, where colourants are used, the use of a liquid formulation enables excellent colour consistency and reproducibility.

In the method, it is preferred if gelling the liquid formulation comprises heat-treating the liquid formulation to a de-blocking temperature at or above which a, or each, blocked isocyanate dissociates thereby allowing the liquid formulation to gel.

Usually, the blocking agent will be selected so that the de-blocking temperature is 110° C. or greater.

In a fourth aspect, the present invention provides a method of covering a surface, the method comprising, providing a paint replacement film as in the first or second aspects, removing the liner layer of the paint replacement film and applying the film to the surface.

The surface may be a painted surface, a metallic surface and/or a plastics surface.

Preferably, the method is performed using an automated system, more preferably a robot.

In a fifth aspect, the present invention provides a motor vehicle having at least one surface at least a portion of said surface being covered with a paint replacement layer adhered to the surface, the paint replacement layer comprising a coloured polymer layer comprising a colourant and polyurethane produced from at least one blocked polyurethane precursor.

The invention is illustrated by the following examples.

EXAMPLES

In the Examples a number of polyurethane films were prepared and characterised as described generally in Table 1 and Table 2. Examples 1 to 10 and the Comparative Examples 1 to 8 did not include colourants. However, as would be appreciated by the skilled person, colourants may be added to these formulations without generally affecting the physical properties of the materials. Paint replacement films based on the polyurethane layers of the Examples would also comprise a liner layer (e.g. a paper liner).

List of Materials

Component A (Polyols)

A1: Capa 3050, polycaprolactone, 100% solids, commercially available from Perstorp Holding AB, Sweden).

A2: Desmophen 690, branched polyester resin, dissolved in methoxypropyl acetate (MPA), 70% solids, commercially available from Bayer Material Science (Germany).

A3: Desmophen 1200, linear aliphatic polycarbonate polyester, 100% solids, commercially available from Bayer Material Science (Germany).

A4: Desmophen 680, branched polyester resin, dissolved in butyl acetate 70% solids, commercially available from Bayer Material Science (Germany).

A5: K-Flex XM 337, aliphatic saturated polyester diol modifier, 100% solids, commercially available from King Industries, (Europe)

A6: Desmophen 670, slightly branched polyester resin, dissolved in butyl acetate at 80% solids, commercially available from Bayer Material Science (Germany).

A7: Desmophen A 165 BA/X, hydroxyl bearing polyacrylate resin, dissolved in BA/X at 65% solids, commercially available from Bayer Material Science (Germany).

The determination of OH equivalent weight for each of these polyols is shown in the table below.

| Polyol Label | Description of Polyol | Polyol type | As supplied | | | | calculated on 100% solid content (i.e. dry weight) | |
| | | | % solids | Solvent | % OH | OH Equivalent weight | % OH (100% solid content) | OH equivalent weight (100% solid content) |
|---|---|---|---|---|---|---|---|---|
| A1 | Capa 3050 | polycaprolactone | 100 | None | 9.5 | 180 | 9.5 | 180 |
| A2 | Desmophen 690 MPA | branched polyester | 70 | Methoxy propyl acetate | 1.4 | 1214 | 2.0 | 850 |
| A3 | Desmophen 1200 | Linear aliphatic polycarbonate polyester | 100 | None | 1.7 | 1000 | 1.7 | 1000 |
| A4 | Desmophen 680 BA | branched Polyester | 70 | Butylacetate | 2.2 | 772 | 3.1 | 548 |
| A5 | K-Flex XM 337 | Aliphatic saturated polyester diol | 100 | None | 6.5 | 260 | 6.5 | 260 |
| A6 | Desmophen 670 BA | slightly branched Polyester | 80 | Butylacetate | 3.5 | 485 | 4.3 | 395 |
| A7 | Desmophen A 165 BA/X | Hydroxyl bearing polyacrylate | 65 | Butylacetate/ Xylene | 1.7 | 1000 | 2.6 | 654 |

Table showing determination of OH equivalent weights of polyols A1 to A7.

An example calculation of the ratio of polyols on OH weight equivalent basis (dry weight, 100% solids) for Example 1 (see Table 1, below) is polyol 1 850×75/100=637.5; polyol 2 1000×25/100=250; Ratio 2.6:1

Component B (Blocked Isocyanates)
B2: Desmodur BL 3575-1, blocked HDI based isocyanate, blocking agent DMP, 75% solids in SN100/MPA, commercially available from Bayer Material Science (Germany).
B3: Desmodur BL 3370, blocked HDI based isocyanate, blocking agent DEM/DIPA, 70% solids in MPA, commercially available from Bayer Material Science (Germany).

Component C (Antioxidant)
C1: Irganox 1010, sterically hindered phenolic antioxidant, pentaerythritoltetrakis(3-(3-5,ditert.butyl-4-hydroxylphenyl)propionate, commercially available from BASF (Germany).

Component D (UV Absorber Blends)
D1: Tinuvin B75, UV-absorber Blend, commercially available from BASF (Germany).
D2: Tinuvin 5060, UV-absorber Blend, commercially available from BASF (Germany).

Component E (Colour Agent)
E1: Kronos CL 2360, titanium dioxide pigment, commercially available from Kronos Europe (Belgium).
E2: Isoversal LM 00670/9174, carbon black paste, commercially available from ISL-Chemie GmbH & Co. KG (Germany).
E3: Isoversal Rot LM 00679/3274, red pigment paste, commercially available from ISL-Chemie GmbH & Co. KG (Germany).
E4: Isoversal Yellow LM 00675/2174, yellow pigment paste, commercially available from ISL-Chemie GmbH & Co. KG (Germany).
E5: Stapa Metallux 1071, aluminium pigment, commercially available as paste, 65% solids, commercially available from Eckart GmbH (Germany).

Component F (Catalyst)
F1: Baerostab DBTL/C (Dibutyltindilaurate), commercially available from Mineral and Pigment Solutions Inc. (USA).

Component G (Wetting Agent)
G1: 3M Novec FC 4434, 25% fluoroaliphatic polymeric esters in dipropylene glycol monomethyl ether, commercially available from 3M (Belgium N.V.).

Component H (Casting Paper or Release Carrier)
H1: 3M-SCW 231, release carrier, prepared as described below.

Release carrier SCW231 comprising a polymer-coated paper was prepared by taking a 108 g HIFI Kraft paper (available from Chem Tenero AG) and coating it with a solution of acrylic release material. The coated paper was then dried to give a dry coating weight of 14-18 g/cm$^2$. The coated paper surface is smooth and glossy and exhibits an average roughness Rz of approximately 1.0 μm.

Component I (Pressure Sensitive Adhesive)
I1: Pressure sensitive adhesive transfer tape, (3M) 9461P Adhesive transfer tape.

TABLE 1

| Example (E) or Comparative (C) | Colour | Layers | Thickness (μm) | Polyol 1 | Polyol 2 | OH equivalent weight of polyols (as supplied) | Ratio of polyols OH equivalent weight (100% solid basis) | Isocyanate Type | blocking group | Component |
|---|---|---|---|---|---|---|---|---|---|---|
| E1 | transparent | dual | 100 | A2 | A3 | 75/25 | 2.6:1 | HDI | DEM/DIPA | B3 |
| E2 | transparent | dual | 100 | A2 | A3 | 65/35 | 1.6:1 | HDI | DEM/DIPA | B3 |
| E3 | transparent | dual | 100 | A2 | A6 | 25/75 | 1:1.4 | HDI | DEM/DIPA | B3 |
| E4 | transparent | dual | 100 | A2 | A6 | 15/85 | 1:2.6 | HDI | DEM/DIPA | B3 |
| E5 | transparent | dual | 100 | A2 | A1 | 25/75 | 1.6:1 | HDI | DEM/DIPA | B3 |
| E6 | transparent | dual | 100 | A2 | A1 | 15/85 | 1:1.2 | HDI | DEM/DIPA | B3 |
| E7 | transparent | dual | 100 | A2 | A1 | 25/75 | 1.6:1 | HDI | DMP | B2 |
| E8 | transparent | mono | 50 | A2 | A6 | 25/75 | 1:1.4 | HDI | DEM/DIPA | B3 |
| E9 | transparent | mono | 75 | A2 | A3 | 70/30 | 2:1 | HDI | DEM/DIPA | B3 |
| E10 | transparent | dual | 100 | A6 | A7 | 75/25 | 1.8:1 | HDI | DEM/DIPA | B3 |
| E11 | silver | dual | 100 | A2 | A1 | 35/65 | 2.5:1 | HDI | DEM/DIPA | B3 |
| E12 | black | mono | 75 | A2 | A3 | 70/30 | 2:1 | HDI | DEM/DIPA | B3 |
| E13 | white | mono | 75 | A2 | A3 | 70/30 | 2:1 | HDI | DEM/DIPA | B3 |
| E14 | red | mono | 75 | A2 | A3 | 70/30 | 2:1 | HDI | DEM/DIPA | B3 |
| E15 | yellow | mono | 75 | A2 | A3 | 70/30 | 2:1 | HDI | DEM/DIPA | B3 |
| C1 | transparent | dual | 100 | A1 | none | 100 | single | HDI | DEM/DIPA | B3 |
| C2 | transparent | dual | 100 | A2 | none | 100 | | HDI | DEM/DIPA | B3 |
| C3 | transparent | dual | 100 | A3 | none | 100 | | HDI | DEM/DIPA | B3 |
| C4 | transparent | dual | 100 | A4 | none | 100 | | HDI | DEM/DIPA | B3 |
| C5 | transparent | dual | 100 | A5 | none | 100 | | HDI | DEM/DIPA | B3 |
| C6 | transparent | dual | 100 | A2 | A3 | 85/15 | 4.8:1 | HDI | DEM/DIPA | B3 |
| C7 | transparent | dual | 100 | A2 | A6 | 75/25 | 6.5:1 | HDI | DEM/DIPA | B3 |
| C8 | transparent | dual | 100 | A2 | A1 | 50/50 | 4.7:1 | HDI | DEM/DIPA | B3 |

Abbreviations:
HDI = Hexamethylendiisocyanate;
DEM: diethylmalonate;
DEM/DIPA: diethylmalonate/diisopropylamine;
DMP: 3,5 dimethyl pyrazole.

Example Preparation

Step 1: Preparation of the Polyurethane Solution

The component F1 was diluted 10% by weight in xylene. The weight % F 1 in the tables 1 and 2 refers to the 10% by weight diluted component F1.

The component G1 was diluted 10% by weight in xylene. The weight % G 1 in the tables 1 and 2 refers to the 10% by weight diluted component G1.

The polyurethane solutions were as indicated in Table 2:

Example E 1-E10, C1-C8

The transparent coating solution were prepared by mixing, adding the polyols (components A1-A7), the UV blend (component D1), the wetting agent (component G1, diluted 10% by weight in Xylene), the catalyst (component F1, diluted 10% by weight in Xylene) and the blocked isocyanate (component B1-B4). The solution was stirred with a lab stirrer for 5-10 min at 200-400 rpm. The formulation of the single components is described in table 1 and table 2. After mixing the polyurethane coating solution was stored at room temperature for 24 hours before coating.

Example E 11, 12, 14, 15

Coloured coating solutions were was prepared by mixing, adding the polyols (components A1-A7), the UV blend (component D1), the wetting agent (component G1, diluted 10% by weight in Xylene), the catalyst (component F1, diluted 10% by weight in Xylene) and the blocked isocyanate (component B1-B4) and coloured pigment pastes (components E2-E5). The solution was stirred with a lab stirrer for 10-15 min at 200-400 rpm. The formulation of the single components described in tables 1 and 2. After mixing the polyurethane coating solution was stored at room temperature for 24 hours before coating.

Example E 13

White coating solutions were was prepared by mixing, adding the polyols (components A1-A7), the UV blend (component D1), the wetting agent (component G1, diluted 10% by weight in Xylene), the catalyst (component F1, diluted 10% by weight in Xylene) and white pigment (component E1). Then dispersing the pigment with a high speed mixer at 3500 rpm for 10-15 minutes. The formulation was stored for 12-24 h at room temperature and then the blocked isocyanate (component B3) was added. The solution was stirred with a lab stirrer for 5-10 min at 200-400 rpm. The formulation of the single components is described in tables 1 and 2. After mixing the polyurethane coating solution was stored at room temperature for 24 hours, before coating.

Step 2: Casting of the Polyurethane Solutions on to the Component H (Casting Paper or Release Carrier)

Example E 8

The coating composition thus prepared was applied to the casting paper using a laboratory scale knife-coater at a wet coating thickness of 70-90 µm. The coating composition was cured by allowing the coated base sheet to stand for 4 minute at 23° C. and then by placing it in a forced air oven at 100° C. for 4 minutes and afterwards at 150° C. for 4 min.

Example E 9 and E 11-E 15

The coating composition thus prepared was applied to the casting paper using a laboratory scale knife-coater at a wet coating thickness of 130-160 µm. The coating composition was cured by allowing the coated base sheet to stand for 6 minute at 23° C. and then by placing it in a forced air oven at 100° C. for 6 minutes and afterwards at 160° C. for 6 min.

Example E 1-E 6, E 10, and C 1-C 8

The coating composition thus prepared was applied to the casting paper using a laboratory scale knife-coater at a wet coating thickness of 60-80 µm. The coating composition was cured by allowing the coated base sheet to stand for 4 minute at 23° C. and then by placing it in a forced air oven at 100° C. for 4 minutes and afterwards at 150° C. for 4 min. Then the coating composition thus prepared was applied to first layer casting paper with PU film, using a laboratory scale knife-coater at a wet coating thickness of 60-80 µm. The coating composition was cured by allowing the coated base sheet to stand for 4 minute at 23° C. and then by placing it in a forced air oven at 100° C. for 4 minutes and afterwards at 150° C. for 4 min.

Example E 7

The coating composition thus prepared was applied to the casting paper using a laboratory scale knife-coater at a wet coating thickness of 60-80 µm. The coating composition was cured by allowing the coated base sheet to stand for 4 minute at 23° C. and then by placing it in a forced air oven at 100° C. for 4 minutes and afterwards at 180° C. for 4 min.

Then the coating composition thus prepared was applied to first layer casting paper with PU film, using a laboratory scale knife-coater at a wet coating thickness of 60-80 µm. The coating composition was cured by allowing the coated base sheet to stand for 4 minute at 23° C. and then by placing it in a forced air oven at 100° C. for 4 minutes and afterwards at 180° C. for 4 min.

Step 3: Lamination of the Component I (Pressure Sensitive Adhesive) with Polyurethane Film Coated onto Component H, Described in Step 2

Example E 1-E 15, and C 1-C 8

The lamination was done by hand with a 30 cm wide rubber roll, (Vaneker & Koch GmbH, Germany), by using with hand pressure and roll one to two times in each direction.

Step 4: Removing the Component H (Casting Paper or Release Carrier)

Example E 1-E 15, and C 1-C 8

The samples from step 3 were stored under room temperature conditions for a least 3 days, before removing the casting paper/release carrier (Component H) from the film surface.

Test Methods
Chemical Resistance
Test Fluids:
Sodium chloride (1%)
Sodium chloride/normalised dirt (each 5%)
Normalised dirt AATCC 123 (5%)
Tree resin solution DuPont Art. 88370020
Pancreatine (Merck Art. 7130)/Demineralized water (1:1)
Test Procedure:
The adhesive coated film samples having the dimension of 10 cm×10 cm are applied on a black painted panel, (standard aluminium with VW repair paint from Krause, Germany) for transparent films and an aluminum panel, available as standard Aluminium (AlMg3, G22) from Schumacher, Germany for pigmented films and conditioned for 24 hrs at 22° C., before application of the test fluids.

Each test fluid is applied onto the film surface by means of a pipette creating a fluid spot between 1-1.5 cm diameter. The prepared sample is placed into an air convection oven for 30 min at 45° C. After removal, the sample is stored for 24 hrs at S.L.C. (23±1° C. and 50±5% relative humidity) to complete full evaporation of all fluids. The spots are individually cleaned and visually evaluated after further 2 hours recovery at S.L.C.

The following failure description and rating is applied.

Rating 0—pass: No change
   no visible change can be detected
Rating 1—pass: Very slight change
   in reflection a closed or interrupted outer swelling edge is visible
   no swelling or defect visible directly from above
   no inner surface swelling or defect
Rating 2—acceptable-pass: Slight change
   in any light a closed or interrupted outer swelling edge is visible
   the inner surface may show minimal change in colour and/or gloss
   no inner surface swelling or defect
Rating 3—fail: Medium change
   in any light a closed or interrupted outer swelling edge is visible
   the inner surface may show moderate change in colour and/or gloss
   no inner surface swelling or defect
Rating 4—fail: Strong change
   strong inner and outer edge swelling
   the inner surface shows strong change in colour and/or gloss
Rating 5—fail: Very strong change
   strong inner and outer edge swelling
   the inner surface shows strong change in colour and/or gloss
   surface defects like wrinkles, blisters, cracks, pin points, etc.

Accelerated Weathering (Xe)

Samples of adhesive-coated films (40×40 mm) adhered to a white painted panel, (steel panel with 648DM640 basecoat and RK8014 clear coat from ACT, USA) were used. The adhered samples were mounted in a Xenon weatherometer (Atlas CI 4000), commercially available from Atlas Electric Devices Co (Chicago, Ill., USA), after 24 h conditioning at 23° C. and 50% relative humidity (according to DIN EN ISO 4892/2(09)). Black Panel/Standard Temperature: 65/70+/−2° C., each cycle comprising a light/waterspray Cycle (minutes) 102/18. Radiation energy 0.55 W/m$^2$. The exposure period was 2500 for coloured films and 4000 hours for transparent films.

The weathering resistance was rated visually according to the following scale:
1 (pass) no or trace visible changes
3 (pass-acceptable) slight-medium visible change
5 (fail) substantial/strong changes in the gloss characteristics, colour change, cracking, bubble or blisters in the film.

Colour change was measured using a Spectrophotometer (Hunterlab LabScan, Hunterlab Spectroflex, Data Colour Spectroflash. Scale—CIELab; Illuminant—D65; Reading angle—10° for Hunterlab devices, 8° for Data Colour device; Reading area diameter—1 inch (25 mm). Measurement was of CIELab, L*, a*, and b* values and in case of comparative measurement automatic calculation of DL*, da*, db* and dE.

Test Procedure: A minimum of a 40×40 mm square of the film was applied to a white substrate panel. First the L*, a*, b* values for the white substrate panel were measured and set as the standard. Then the L*, a*, b* values for the film sample applied to this substrate panel were measured. Both measurements were performed with the same equipment configuration and parameters, as described above.

The device software calculates the dE, dL*, da*, db* from both measurements.

In case of testing aging behaviour, this method was applied on same panel and samples before and after aging exposure. Both sets of dE, dL*, da*, db* were determined and values subtracted to obtain the delta dE, delta dL*, delta da* and delta dB* values.

Colour change (delta dE) is ranked as follows
For Transparent:
≤2.0: pass
>2.0: fail
For Coloured:
≤5.0: pass
>5.0: fail The gloss loss (delta gloss) was measured according to DIN 67530 using a hand-held gloss meter, (available as model micro-TRI-gloss from Byk Gardner, Germany). The measurement angle was 60°. The gloss was measured before and after exposure. The difference in gloss was calculated as delta gloss (Dgloss).

Ranking of Delta Gloss is as Follows:
≤25 pass
>25 fail

Heat Resistance (7 Days 100° C.)

A sample of the adhesive coated film having a width of 40×40 mm was adhered to a white painted panel, (steel panel with 648DM640 basecoat and RK8014 clear coat from ACT, USA) by using a rubber roller and hand pressure. The adhered sample was stored for 24 hours at S.L.C. The adhered sample was placed in a forced air oven at 100° C. for 7 days.

The heat resistance was rated visually according to the following scale:
1 (pass) no or trace visible changes
3 (pass borderline) slight-medium visible change
5 (fail) substantial/strong changes in the gloss characteristics of the, colour change film cracking, bubble, blisters.

Colour change was measured using a Spectrophotometer (Hunterlab LabScan, Hunterlab Spectroflex, Data Colour Spectroflash. Scale—CIELab; Illuminant—D65; Reading angle—10° for Hunterlab devices, 8° for Data Colour device; Reading area diameter—1 inch (25 mm) or other according to specification). Measurement was of CIELab, L*, a*, and b* values and in case of comparative measurement automatic calculation of DL*, da*, db* and dE.

Test Procedure: A minimum of a 40×40 mm square of the film was applied to a white substrate panel. First the L*, a*, b* values for the white substrate panel were measured and set as the standard. Then the L*, a*, b* values for the film sample applied to this substrate panel were measured. Both measurements were performed with the same equipment configuration and parameters, as described above.

The device software calculates the dE, dL*, da*, db* from both measurements.

In case of testing aging behaviour this method was applied on the same panel and samples before and after aging exposure. Both sets of dE, dL*, da*, db* were determined and subtracted to obtain the delta dE, delta dL*, delta da* and delta dB* values.

Colour change (dE) was ranked as follows:
≤2.1: pass
>2.1: fail

Heat Resistance (1000 Hours at 80° C.)

A sample of the adhesive coated film having a width of 40×40 mm was adhered to a white painted panel, (steel panel with 648DM640 basecoat and RK8014 clear coat from ACT, USA) using a rubber roller and hand pressure. The adhered sample is stored for 24 hours at S.L.C. The adhered sample was placed in a forced air oven at 80° C. for 1000 hours.

The heat resistance was rated visually according to the following scale:
1 (pass) no or trace visible changes
3 (pass borderline) slight-medium visible change
5 (fail) substantial/strong changes in the gloss characteristics of the film cracking, bubble, blisters.

Colour change was measured using a Spectrophotometer (Hunterlab LabScan, Hunterlab Spectroflex, Data Colour Spectroflash. Scale—CIELab; Illuminant—D65; Reading angle—10° for Hunterlab devices, 8° for Data Colour device; Reading area diameter—1 inch (25 mm). Measurement was of CIELab, L*, a*, and b* values and in case of comparative measurement automatic calculation of DL*, da*, db* and dE.

Test Procedure: A minimum of a 40×40 mm square of the film was applied to a white substrate panel. First the L*, a*, b* values for the white substrate panel were measured and set as the standard. Then the L*, a*, b* values for the film sample applied to this substrate panel were measured. Both measurements were performed with the same equipment configuration and parameters, as described above.

The device software calculates the dE, dL*, da*, db* from both measurements.

In case of testing aging behaviour this method was applied on the same panel and samples before and after aging exposure. Both sets of dE, dL*, da*, db* were determined and subtracted to obtain the delta dE, delta dL*, delta da* and delta dB* values.

Colour change (delta dE) was ranked as follows:
≤1.0 pass
≥1.1 fail

Mechanical Properties:

Mechanical properties were measured according to DIN EN ISO 527/3/2/300, using a tensile tester (model Z 005 from Zwick, Germany). Mechanical properties, such as tensile strength at break (N/mm$^2$) and tensile elongation at break (%) were tested by using a 25.4 mm width×150 mm length film sample. A test speed of 300 mm/min was used. The test length was 100 mm. The test samples were stored for 24 hours at 23° C./50% relative humidity before testing.

Tensile Strength at Break (N/Mm$^2$)
pass≥10.0 N/mm$^2$
fail<10.0 N/mm$^2$

Tensile Elongation at Break (%):
pass≥100%
fail<100%

Glass Transition Temperature ($T_g$):

Dynamic mechanical analysis and sample preparation were performed according to ASTM E 1640-09 standard and the standards mentioned therein. Dynamic mechanical measurements were performed on a DMTA V (Rheometric Scientific) in tension mode at a fixed frequency of 1 Hz and fixed strain of 0.05% in a temperature range from −100 to +150° C. with a heating rate of 2° C./min. The temperature of the peak of the tangent delta curve was taken to represent the glass transition temperature $T_g$. Specimens of rectangular shape measuring between 9×3×0.05 min and 10×4×0.15 mm were used. The temperature calibration was done using a Fluke 724 Temperature Calibrator (regularly calibrated by an accredited calibration institute). PVC standards (available through RHEO Service) were measured on the DMTA periodically to check temperature accuracy.

Test Results

Test results for the Examples and the Comparative Examples are shown in Tables 3 to 6, below.

TABLE 2

| | Components (wt %) | | | | | | | | | | | | | | | | | | | |
|---|---|---|---|---|---|---|---|---|---|---|---|---|---|---|---|---|---|---|---|---|
| | A1 | A2 | A3 | A4 | A5 | A6 | A7 | B1 | B2 | B3 | B4 | C1 | D1 | D2 | E1 | E2 | E3 | E4 | E5 | F1 | G1 |
| Example 1 | — | 50.2 | 13.8 | — | — | — | — | — | — | 27.2 | — | — | 6.6 | — | — | — | — | — | — | 0.4 | 1.8 |
| Example 2 | — | 44.0 | 19.5 | — | — | — | — | — | — | 27.6 | — | — | 6.6 | — | — | — | — | — | — | 0.4 | 1.8 |
| Example 3 | — | 23.8 | — | — | — | 28.8 | — | — | — | 38.7 | — | — | 6.4 | — | — | — | — | — | — | 0.4 | 1.8 |
| Example 4 | — | 15.2 | — | — | — | 34.9 | — | — | — | 41.3 | — | — | 6.3 | — | — | — | — | — | — | 0.4 | 1.8 |
| Example 5 | 29.9 | 13.4 | — | — | — | — | — | — | — | 48.7 | — | — | 5.5 | — | — | — | — | — | — | 0.4 | 2.0 |
| Example 6 | 20.2 | 17.1 | — | — | — | — | — | — | — | 54.9 | — | — | 5.6 | — | — | — | — | — | — | 0.3 | 1.8 |
| Example 7 | 33.0 | 14.5 | — | — | — | — | — | — | 44.8 | — | — | — | 5.5 | — | — | — | — | — | — | 0.3 | 1.8 |
| Example 8 | — | 23.8 | — | — | — | 28.8 | — | — | — | 38.7 | — | — | 6.4 | — | — | — | — | — | — | 0.4 | 1.8 |
| Example 9 | — | 49.0 | 16.9 | — | — | — | — | — | — | 26.5 | — | — | 5.1 | — | — | — | — | — | — | 0.7 | 1.8 |
| Example 10 | — | — | — | — | — | 30.3 | 20.6 | — | — | 40.6 | — | — | 6.3 | — | — | — | — | — | — | 0.4 | 1.8 |
| Example 11 | 35.5 | 9.8 | — | — | — | — | — | — | — | 41.2 | — | — | 5.1 | — | — | — | — | — | 6.4 | 0.3 | 1.7 |
| Example 12 | — | 45.0 | 15.5 | — | — | — | — | — | — | 24.3 | — | — | 6.4 | — | — | 6.4 | — | — | — | 0.6 | 1.7 |
| Example 13 | — | 34.1 | 11.8 | — | — | — | — | — | — | 18.4 | — | — | 4.9 | — | 29.1 | — | — | — | — | 0.5 | 1.3 |
| Example 14 | — | 41.4 | 16.4 | — | — | — | — | — | — | 25.7 | — | — | 6.3 | — | — | — | 7.9 | — | — | 0.6 | 1.7 |
| Example 15 | — | 39.8 | 15.8 | — | — | — | — | — | — | 24.7 | — | 0.6 | — | 5.5 | — | — | — | 11.4 | — | 0.6 | 1.6 |
| Comparative Example 1 | 24.7 | — | — | — | — | — | — | — | — | 67.4 | — | — | 5.7 | — | — | — | — | — | — | 0.4 | 1.8 |
| Comparative Example 2 | — | 65.9 | — | — | — | — | — | — | — | 26.8 | — | — | 5.2 | — | — | — | — | — | — | 0.3 | 1.9 |

TABLE 2-continued

| | Components (wt %) | | | | | | | | | | | | | | | | | | | | |
|---|---|---|---|---|---|---|---|---|---|---|---|---|---|---|---|---|---|---|---|---|---|
| | A1 | A2 | A3 | A4 | A5 | A6 | A7 | B1 | B2 | B3 | B4 | C1 | D1 | D2 | E1 | E2 | E3 | E4 | E5 | F1 | G1 |
| Comparative Example 3 | — | — | 61.1 | — | — | — | — | — | — | 30.1 | — | — | 6.6 | — | — | — | — | — | — | 0.4 | 1.8 |
| Comparative Example 4 | — | — | — | 45.7 | — | — | — | — | — | 45.9 | — | — | 6.2 | — | — | — | — | — | — | 0.4 | 1.8 |
| Comparative Example 5 | — | — | — | — | 35.6 | — | — | — | — | 56.2 | — | — | 6.0 | — | — | — | — | — | — | 0.4 | 1.8 |
| Comparative Example 6 | — | 56.1 | 8.2 | — | — | — | — | — | — | 26.9 | — | — | 6.6 | — | — | — | — | — | — | 0.4 | 1.8 |
| Comparative Example 7 | — | 54.4 | — | — | — | — | 7.3 | — | — | 29.5 | — | — | 6.6 | — | — | — | — | — | — | 0.4 | 1.8 |
| Comparative Example 8 | 47.1 | 7.1 | — | — | — | — | — | — | — | 38.3 | — | — | 5.3 | — | — | — | — | — | — | 0.3 | 1.8 |

TABLE 3

| Example (E) or Comparative (C) | $T_g$ (° C.) | Chemical Resistance Tests | | | | |
|---|---|---|---|---|---|---|
| | | NaCl | NaCl + normal dirt | normal dirt | tree sap | pancreatin |
| E1 | 35.2 | 0 | 0 | 0 | 1 | 2 |
| E2 | 26.0 | 0 | 0 | 0 | 1 | 0 |
| E3 | 36.1 | 0 | 0 | 0 | 1 | 0 |
| E4 | — | 0 | 0 | 0 | 1 | 0 |
| E5 | 36.6 | 0 | 0 | 0 | 0 | 0 |
| E6 | — | 0 | 0 | 0 | 1 | 0 |
| E7 | — | 0 | 0 | 0 | 1 | 0 |
| E8 | — | 0 | 0 | 0 | 1 | 0-1 |
| E9 | — | 0 | 0 | 0 | 1 | 0 |
| E10 | — | 0 | 0 | 0 | 1 | 1 |
| E11 | — | 0 | 0 | 1 | 2 | 2 |
| E12 | — | 0 | 0 | 1 | 2 | 0 |
| E13 | — | 0 | 1 | 1 | 1-2 | 2 |
| E14 | — | 0 | 0 | 1 | 1 | 0 |
| E15 | — | 0 | 0 | 0 | 1 | 0 |
| C1 | | 0 | 0 | 0 | 1 | 0 |
| C2 | | 0 | 1 | 0 | 0 | 4 |
| C3 | | 0 | 3 | 3 | 2 | 4 |
| C4 | | 2 | 3 | 3 | 2 | 5 |
| C5 | | 0 | 0 | 1 | 2 | 0 |
| C6 | 42.1 | 2 | 3 | 3 | 1 | 5 |
| C7 | 55.3 | 0 | 2 | 3 | 0 | 5 |
| C8 | 50.0 | 2 | 3 | 1 | 0 | 5 |

TABLE 4

| Example (E) or Comparative (C) | Tensile strength (N/mm$^2$) | Elongation at break (%) |
|---|---|---|
| E1 | 15.14 | 185.36 |
| E2 | 11.02 | 238.76 |
| E3 | 21.67 | 174.74 |
| E4 | 15.59 | 154.4 |
| E5 | 16.93 | 134.73 |
| E6 | 22.47 | 134.00 |
| E7 | 18.71 | 158.83 |
| E8 | 21.32 | 144.15 |
| E9 | 13.02 | 205.26 |
| E10 | 16.09 | 121.42 |
| E11 | — | — |
| E12 | 10.5 | 173.46 |
| E13 | 14.4 | 137.28 |
| E14 | 10.18 | 159.63 |
| E15 | 11.29 | 174.12 |
| C1 | — | — |
| C2 | — | — |
| C3 | — | — |
| C4 | — | — |
| C5 | 13.96 | 177.00 |
| C6 | 18.58 | 154.3 |
| C7 | 43.39 | 4.06 |
| C8 | 26.21 | 40.6 |

TABLE 5

| Example (E) or Comparative (C) | Heat resistance 7 d 100° C. | | | Heat resistance 1000 h 80° C. | | |
|---|---|---|---|---|---|---|
| | Visual | dGloss | dE | Visual | dGloss | dE |
| E1 | 3 slight yellowing | −1 | 1.67 | 3 slightly darker/slight yellowing | 2.8 | 0.85 |
| E2 | 3 trace structure, slight yellowing | 0.7 | 1.26 | not tested | | |
| E3 | 3 slight yellow | 1.8 | 2.09 | 3 slightly yellow, glossy, less structure | 16.6 | 0.60 |
| E4 | — | — | — | 1 trace y. | | 0.68 |
| E5 | 3 slight yellow | 0.7 | 2.03 | 1 — | −2.2 | 0.44 |
| E6 | — | — | — | 1 trace y. | | 0.71 |
| E7 | 1 | | 0.42 | | | |
| E8 | 3 slight yellow | | 1.69 | 1 minimal y. | | 0.37 |

TABLE 5-continued

| Example (E) or Comparative (C) | Heat resistance 7 d 100° C. | | | Heat resistance 1000 h 80° C. | | |
|---|---|---|---|---|---|---|
| | Visual | dGloss | dE | Visual | dGloss | dE |
| E9 | 3 slight yellow | 2.4 | 0.91 | — | — | — |
| E10 | — | | 2.1 | 1 trace y. | — | 0.78 |
| E11 | 1 trace colour change, mat | −8.8 | 0.43 | 5 sparkling spots, slight colour change to brown, structure | −4.2 | 0.74 |
| E12 | 3 slight mat, structure, trace colour change | −12.2 | 0.56 | — | — | — |
| E13 | 3 slight yellow, matt | −18.9 | 1.99 | — | — | — |
| E14 | 3 trace darker, slight mat | −6.4 | 0.39 | — | — | — |
| E15 | 1 Trace mat | −9.1 | 1.26 | — | — | — |
| C1 | 3 slight yellow | 1.4 | 2.15 | 3 slight yellow | 3.7 | 1.14 |
| C2 | 3 slight yellow | −10.8 | 2.72 | not tested | | |
| C3 | 3 slight yellow | −2.3 | 2.71 | not tested | | |
| C4 | 3 slight yellow | 0.8 | 2.47 | 3 slight yellow | 1.2 | 0.81 |
| C5 | 5 yellow | 0.5 | 2.75 | 5 yellow | −0 | 1.90 |
| C6 | 5 yellow | −0.8 | 2.3 | 3 slightly darker/slight yellowing | 3.2 | 1.03 |
| C7 | 5 yellow | −2.4 | 3.51 | | | |
| C8 | 3 | | | | | |

TABLE 6

| Example (E) or Comparative (C) | Weathering Xenon 4000 h | | | |
|---|---|---|---|---|
| | | Visual | dGloss | dE |
| E1 | 1 * | trace darker | 1 | 0.54 |
| E2 | | | | |
| E3 | | | | |
| E4 | | | | |
| E5 | 1 * * | trace yellow | −2.7 | 0.34 |
| E6 | | | | |
| E7 | — | | | |
| E8 | | | | |
| E9 | — | — | — | — |
| E10 | | | | |
| E11 | 3 | matt, slight colour change | −37.2 | 0.86 |
| E12 | — | — | — | — |
| E13 | — | — | — | — |
| E14 | — | — | — | — |
| E15 | — | — | — | — |
| C1 | | | | |
| C2 | 5 | cracking (two to substrate ca 2 mm), edge swelling (ca 3 mm) | −55.2 | 1.13 |
| C3 | | | | |
| C4 | | | | |
| C5 | | | | |
| C6 | 1 * | trace darker | 1.5 | 0.51 |
| C7 | | | | |
| C8 | | | | |

The invention claimed is:

1. A method of producing a paint replacement film, the method comprising, providing a backing layer, providing a liquid formulation comprising at least two polyols in an OH weight equivalent ratio in the range 4.5:1 to 1:4.5 and one or more blocked isocyanates, cast-coating the backing layer with the liquid formulation, and gelling the liquid formulation, thereby forming a polymer layer comprising polyurethane, wherein the polymer layer is a coloured polymer layer comprising a colourant and further wherein the polyurethane has a glass transition temperature ($T_g$) according to ASTME 1640-09 standard below 42° C.

2. A method as claimed in claim 1, wherein gelling the liquid formulation comprises heat-treating the liquid formulation to a de-blocking temperature at or above which a, or each, blocked polyurethane precursor dissociates thereby allowing the liquid formulation to gel.

* * * * *